(12) United States Patent
Hsu et al.

(10) Patent No.: US 7,864,871 B1
(45) Date of Patent: *Jan. 4, 2011

(54) INTERCIRCUIT COMMUNICATIONS APPARATUS AND METHOD

(75) Inventors: Yungping Hsu, Cupertino, CA (US); Lawrence Tse, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 894 days.

This patent is subject to a terminal disclaimer.

(21) Appl. No.: 11/805,634

(22) Filed: May 24, 2007

Related U.S. Application Data (63) Continuation of application No. 10/214,525, filed on Aug. 7, 2002, now Pat. No. 7,230,988.

(51) Int. Cl.
*H04L 27/00* (2006.01)
(52) U.S. Cl. ........................ 375/259; 375/219
(58) Field of Classification Search ................ 375/259, 375/219, 228–232, 224, 316, 320, 340, 221; 341/126, 138, 139; 455/230, 234.1, 245.1, 455/250.1, 352, 355, 73
See application file for complete search history.

(56) References Cited

U.S. PATENT DOCUMENTS

| | | | | |
|---|---|---|---|---|
| 4,296,320 A * | 10/1981 | Miller | | 250/252.1 |
| 5,337,257 A | 8/1994 | White | | 702/73 |
| 5,834,975 A | 11/1998 | Bartlett et al. | | |
| 5,896,064 A | 4/1999 | Kaku | | |
| 6,167,244 A | 12/2000 | Tomoe | | |
| 6,172,773 B1 | 1/2001 | Ulichney | | 358/3.13 |
| 6,260,184 B1 | 7/2001 | Brennan et al. | | |
| 6,281,704 B2 | 8/2001 | Ngai et al. | | |
| 6,324,228 B1 | 11/2001 | Millward et al. | | |
| 6,721,368 B1 | 4/2004 | Younis et al. | | |
| 6,842,495 B1 | 1/2005 | Jaffe et al. | | |
| 7,230,988 B1 * | 6/2007 | Hsu et al. | | 375/259 |
| 7,369,619 B1 * | 5/2008 | Hsu et al. | | 375/259 |

OTHER PUBLICATIONS

IEEE Std 802.11a—1999, Sponsor LAN MAN Standards Committee of IEEE Computer Society, "Part 11: Wireless LAN Medium Access Control (MAC) and Physical Layer (PHY) Specifications, High-Speed Physical Layer in the 5 GHz Band".

IEEE Std 802.11b—1999, Sponsor LAN MAN Standards Committee of IEEE Computer Society, "Part 11: Wireless LAN Medium Access Control (MAC) and Physical Layer (PHY) Specifications, Higher-Speed Physical Layer Extension in 2.4 GHz Band."

(Continued)

*Primary Examiner*—Temesghen Ghebretinsae (57) ABSTRACT

A system comprises a circuit that stores a first value and M parallel signal lines that communicate with the circuit, where M is an integer greater than three. A difference controller that receives the first value via the M parallel signal lines, that compares the first value to a first reference value, and that generates control signals based on a difference between the first value and the first reference value. An accumulator circuit that communicates with N signal lines, that stores a second reference value and that performs one of increment and decrement function to adjust the second reference value based on the control signals, where N is less than or equal to three.

28 Claims, 5 Drawing Sheets

OTHER PUBLICATIONS

ANSI/IEEE Std 802.11, 1999, Sponsor LAN MAN Standards Committee of IEEE Computer Society, "Part 11: Wireless LAN Medium Access Control (MAC) and Physical Layer (PHY) Specifications."

ANSI/IEEE Std 802.11g/D2, Draft 2002 Edition, Sponsor LAN MAN Standards Committee of IEEE Computer Society, "Future Higher-Speed Physical Layer Extension in 2.4 GHz Band."

* cited by examiner

INTERCIRCUIT COMMUNICATIONS APPARATUS AND METHOD

CROSS-REFERENCE TO RELATED APPLICATIONS

This application is a Continuation of U.S. patent application Ser. No. 10/214,525 filed on Aug. 7, 2002. The disclosure of the above application is incorporated herein by reference.

FIELD OF THE INVENTION

The present invention is generally directed to digital communications and is specifically concerned with intercircuit communications utilizing a reduced set of signal lines.

BACKGROUND OF THE INVENTION

The past decade has witnessed a remarkable miniaturization of electronic devices with ever increasing complexity and functionality. The move towards enhanced functionality while minimizing circuit size has led electronics designers to incorporate more functionality per integrated circuit ("IC") as well as integrate the functions previously handled by a group of ICs into a single IC. In either case, a side effect of larger scale integration has been the issue of how to send and extract aggrandizing amounts as well as more varied types of data to and from these super-size chips. The conventional response has been to increase pinout of the chip carrier packages housing such ICs thereby providing more potential connection points to other electronic components and devices, including other ICs. But, once nominal two-dimensional pin density has been achieved in traditional circuit board applications, as in the case of ball grid array and pin grid array packaged ICs, further increasing the number of pins or leads requires a proportionally larger chip package and consequent circuit board real estate to accommodate them. Moreover, additional pins means additional circuit traces and lead lines which increase circuit board layout complexity, opportunities for noise and interference in high-speed and RF applications, and cuts against opportunities for further size reduction.

In another approach, especially useful in price-sensitive consumer applications, the industry has re-embraced the use of commodity or modular integrated circuits which can easily be cobbled together to perform required functionality. This approach avoids having to design a custom integrated circuit and its attendant high development, production and testing costs. However, the market still requires more functionality in a smaller package, electronics designers still must place a premium on board real estate and must make general efforts to reduce or minimize the number of chip traces as well as focus on smaller modular chips having smaller landing areas and consequently more compact or reduced chip carrier pinouts since pinouts are becoming a primary limiting factor in chip carrier minaturization. Accordingly, in either approach there is a need to reduce the number of pins required as well as the number of traces or intercircuit communication lines that need to be accommodated in order to carry out interchip and, more generally, intercircuit communications.

Figure 1:
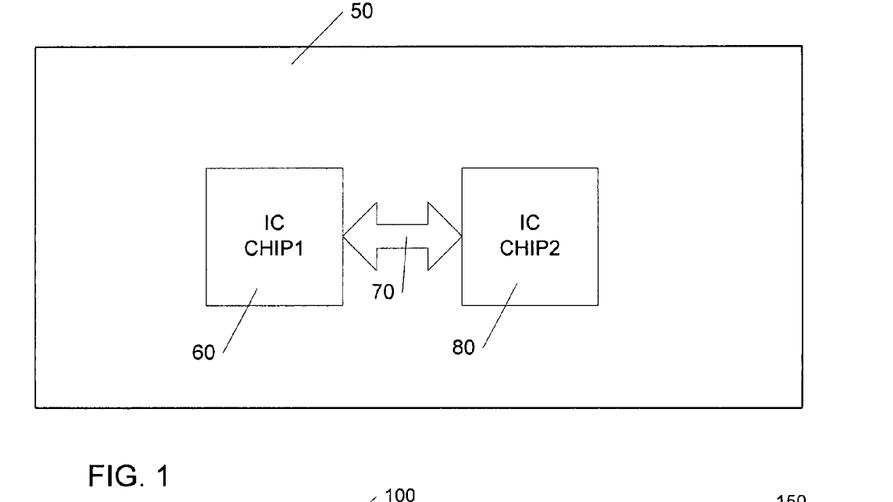
FIG. 1 diagrammatically illustrates an operating environment in which intercircuit communication according to the prior art and according to the disclosed embodiments of the invention may be practiced.

FIG. 1 illustrates a simplified diagram of a circuit board 50 including first and second IC chip carriers or chips 60, 80 disposed thereon. A generic communications path 70 communicatively couples the first and second chips 60, 80 and typically includes one or more signal traces. It would be advantageous to reduce the number of traces within the communications path 70 and ultimately reduce pinout requirements for communicating information between the first and second chips along this path 70.

Figure 2:
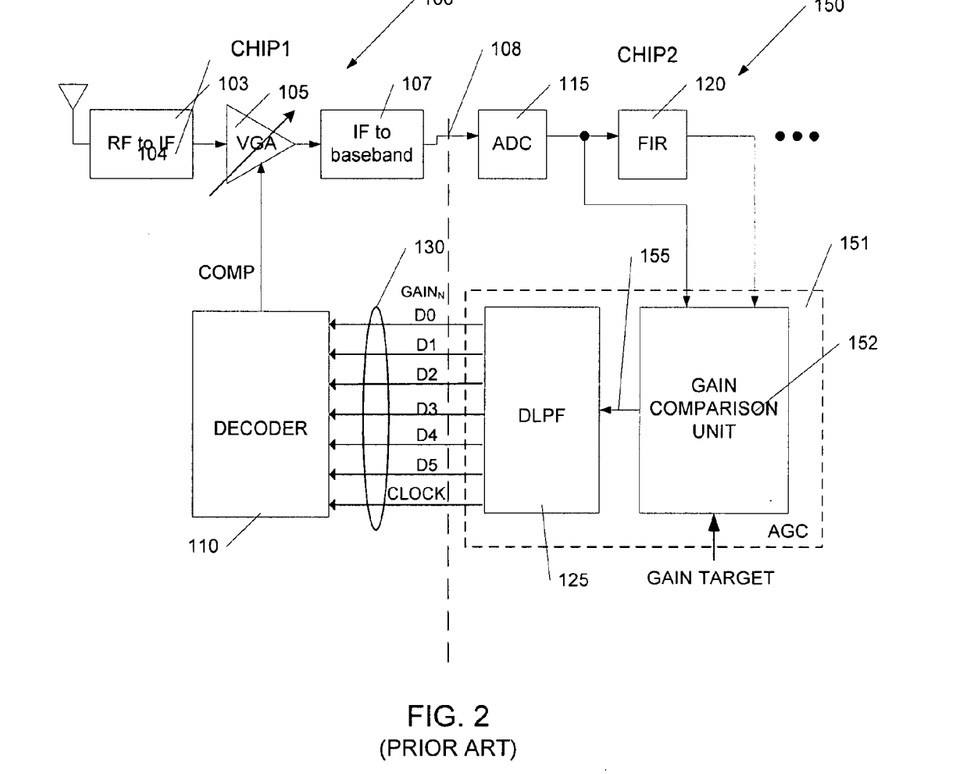
FIG. 2 is a simplified block diagram of a prior art intercircuit communication scheme.

FIG. 2 illustrates a prior art interchip communication scheme consistent with the board level environment shown in FIG. 1. In particular, this figure illustrates conventional intercircuit communication between an RF-baseband conversion circuit 100 and a baseband processing circuit 150 of a wireless receiver. This wireless receiver may be configured for operation consistent with the base IEEE 802.11 (1999) Standard as well as the high rate PHY extensions IEEE 802.11b (1999), IEEE 802.11a (1999), and/or draft IEEE 802.11g (2002). Thus, the RF circuit includes an RF to IF demodulator 103, a variable gain amplifier ("VGA") 105, and an IF to baseband downconverter 107 to present the baseband analog signal bearing the received data of interest to the baseband processing circuit 150. The VGA 105 forms an operational part of a self-adjusting or automatic gain control system which spans the ICs 60, 80.

The automatic gain control system seeks to optimize the amplitude of the still phase-modulated analog IF signal 104 generated by the demodulator 103 to ensure that the dynamic range of the analog-to-digital converter ("ADC") 115 of the baseband processing circuit 150 is fully utilized when converting the baseband version 108 of this signal into digital form. Gain feedback from the output of the ADC 115 or the adjacent bandpass filter or FIR 129 is utilized to automatically compensate and control the variable gain amplifier 105. However, since the feedback is obtained within the second chip 80 and the VGA 105 is formed within the first chip 60 as part of the RF-baseband processing circuit 100, the feedback must be sent across an interposing interchip data path such as the data path 70 shown in FIG. 1. To that end, feedback output of the ADC 115 or the FIR 120 (depending on the implementation) is fed to a gain comparison unit 152 of an automatic gain control ("AGC") feedback unit 151 for comparison against an ideal or nominal gain signal ("GAIN TARGET" in FIG. 2) as is well known in the art. The instantaneous gain error 155 resulting from this comparison then undergoes low-pass filtering by the digital low pass filter 125. The digital low-pass filter then generates a 6 bit binary vector, a type of numeric data representing the adjusted gain setting $GAIN_N$ the VGA 105. In this arrangement, the adjusted gain setting $GAIN_N$ is synchronously transmitted across a set of signal lines 130 (data lines D0 ... D5 & clock) to the RF-baseband conversion circuit 100 via decoder 110, which in turn recovers gain compensation information ("COMP" in FIG. 2) necessary to control the VGA 105 based on the received $GAIN_N$ numeric data. Assuming the VGA 105 has 64 programmable gain settings, 6 bits of numeric data is needed to convey the adjusted gain setting, and so six signal lines 130 D0 ... D5 plus a CLOCK signal are used to transmit the numeric data in parallel gain amplifier 105. Thus, according to this approach, seven signal lines or traces is required to synchronously convey $GAIN_N$ numeric data from the baseband processing circuit 150 to the RF-baseband conversion circuit 100. In a limited pinout environment, this represents a relatively wasteful number of dedicated pins (seven on each chip).

As few as two pins on each chip 60, 80 would be required to directly transmit the numeric data using conventional serial transmission techniques. But because of the rapidly changing gain characteristics exhibited by received signals formatted in accordance with the above-mentioned 802.11 standards as well as the processing overhead required, conventional serial transmission of the numeric data is believed to be an unsuitable choice.

Thus, in addition to reducing pinout and circuit traces generally, it would be advantageous if a number of the signal lines 130 needed to convey numeric data could be reduced in order to reduce circuit board 50 real estate and associated pinout requirements for the first and second chips 60, 80. In RF applications such as described above with reference to FIG. 2, reducing the number of necessary circuit board signal traces including signal lines 130 to convey numeric data between chips 60 and 80 is believed to of particular importance here because of their potential for picking up stray RF noise and interference.

SUMMARY OF THE INVENTION

To address these and other perceived shortcomings, the invention is directed to a method and apparatus for communicating numeric data between first and second circuits incorporating a controller communicatively coupled to the first circuit to receive the numeric data, and an accumulator communicatively coupled to the second circuit and the controller, the accumulator comprising accumulator logic managing reference data, the controller being responsive to the numeric data selectively causing the accumulator logic to increment or decrement the reference data to match the numeric data. The accumulator will notify the second circuit of the so-updated reference data.

In one disclosed embodiment of the invention, three signal lines (UP, DN, CLK) are used by the controller to direct the accumulator to increment, decrement, reset or hold the reference data. In another embodiment, only two signal lines are used at the expense of reset complexity.

The inventive method and apparatus permit significant trace and pinout savings over parallel transfer yet are believed to be more timely responsive than conventional serial transfer, including where changes in numeric data are relatively continuous.

Additional aspects and advantages of this invention will be apparent from the following detailed description of embodiments thereof, which proceeds with reference to the accompanying drawings.

DETAILED DESCRIPTION OF THE PREFERRED EMBODIMENTS

Figure 3:
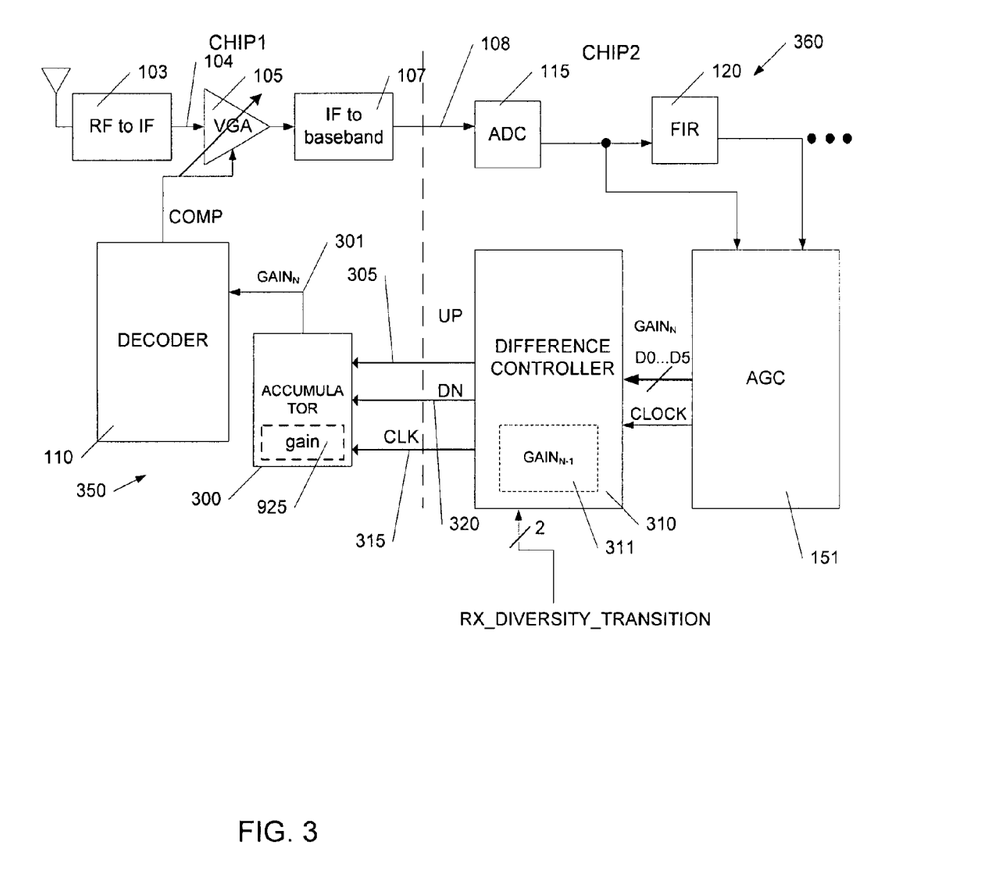
FIG. 3 is a wireless receiver incorporating an intercircuit communication apparatus according to a first embodiment of the invention.

FIG. 3 is a simplified block diagram of a wireless receiver incorporating an intercircuit communication apparatus according to a first embodiment of the invention. In comparison with the conventional wireless receiver shown in FIG. 2, the receiver FIG. 3 augments the aforementioned digital low pass filter 125 with a difference controller 310 communicatively coupled to a complementary accumulator 300 interposing it and the decoder 110 shown in FIG. 2. The controller 310 has two binary logic signals UP, DN (down), and CLK (clock) presented on three respective signal lines 305, 320, and 315. The difference controller 310 asserts these UP, DN and CLK signals based on a comparison between the adjusted gain setting $GAIN_N$ generated by the AGC 151 and the previous gain setting $GAIN_{N-1}$ contained in memory 311 within or otherwise accessible to the controller 310. Here, assertion or issuance of the UP signal on the signal line 305 by the controller 310 causes the accumulator 300 to, in conjunction with the decoder 110, increase the output of the gain of the variable gain amplifier 105 at rate in accordance with the frequency of the clock signal CLK on line 315. The DN signal, when issued by the controller 310, causes the accumulator 300-decoder 110 tandem to decrease the gain of the VGA 105.

More particularly, the accumulator 300 increments a gain value on each CLK pulse asserted on line 315 where the UP signal is at logic 1 or true and the DN signal is at logic 0 or false, and decrements the reference data on each CLK pulse while the UP signal is at logic 0 or false and the DN signal is at logic 1 or true. The updated reference data, which corresponds to the adjusted gain setting $GAIN_N$, is sent by the accumulator 300 to the decoder 110 where it is converted into native gain compensation control information for the VGA 105 when a predetermined time interval has elapsed since the last CLK pulse, thereby altering the gain characteristics of the VGA 105 responsive to the feedback perceived by the controller 310. In other words, the controller communicates the numeric data representing a new or updated VGA 105 setting ascertained on the basis of feedback information provided by the output of the ADC 115 or FIR 120 and notifies the accumulator 300 of such numeric data indirectly by using the up and down signal lines 305, 320 in conjunction with the CLK line 315 to adjust reference data (gain) managed by the accumulator 300 until it matches such numeric data. Thus, even where the gain resolution of the VGA 105 spans up to 64 programmable levels, and six bits of data is ordinarily required to identify the desired gain level, this embodiment demonstrates that only three signal lines including a clock are necessary between baseband processing circuit 360 and the RF-baseband conversion circuit 350.

It should be noted that a reduced number of signal lines are employed at the expense of the extra time and processing needed to increment or decrement the accumulator reference data to match the controller numeric data. However, consistent with this embodiment, additional UP/DN signal combinations may be utilized to reset the reference data to one of two known states in order to more quickly arrive at a reference data matching the numeric data of interest. If both the UP and DN signals are at logic level 0 or false during a CLK pulse, the accumulator 310 resets the reference data to a first predetermined gain level, such as the initial gain associated with the first antenna of a diversity receiver implementation. Likewise, if the UP and DN signals are both at logic level 1 or true during a CLK pulse, the accumulator 310 resets a reference data to a second predetermined gain level, such as the initial gain associated with the second antenna in the diversity receiver implementation. Further, if no CLK pulse is detected after VGA updating has occurred, the accumulator 310 holds the reference data at its current value, i.e., the gain is held constant.

Figure 5:
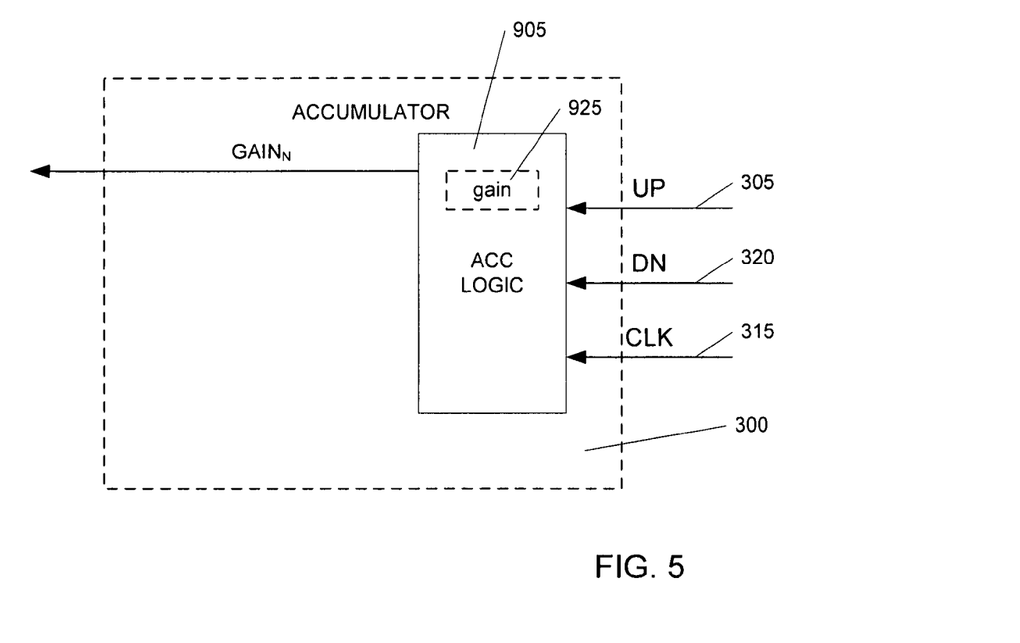
FIG. 5 is a more detailed block diagram of the accumulator 300 shown in FIG. 3.

Referring briefly to FIG. 9 is a more detailed block diagram of the accumulator 300 shown in FIG. 1. Here, an accumulator logic unit 905 receives and interprets the UP, DN and CLK signals asserted on signal lines 305, 320, and 315 respectively by the controller 310. The accumulator logic unit 905 also internally manages the gain reference data within memory 925 (such as through the use of an appropriate number of D flip-flops sufficient to store the numeric data of interest). In a diversity receiver implementation, the initial value of the accumulator may be obtained from one of two programmable configuration registers (not shown in the figures) containing the initial gain of the receiver using either the first or second antennas respectively. In other implementations, other initial values, may be programmed into the accumulator depending on operational requirements as is known in the art. These initial gain information are identical to the initial gain in the RF chip to be consistent . . . . The accumulator logic 905 is strobed by the CLK 315 to reconstruct the same $GAIN_N$ as calculated in the baseband processor. This $GAIN_N$ signal then goes to the decoder 110 current the $GAIN_N$ signal into corresponding COMP information native to the VGA 105 to control the VGA 105 responsive to the updated gain setting $GAIN_N$.

A summary of the logic relationship between the UP, DN, and CLK signals in accordance with the first disclosed embodiment may be had with reference to the following table:

| CLOCK | UP | DOWN | ACTION |
|---|---|---|---|
| Active | 0 | 0 | Reset to first predetermined gain level: e.g. initial gain for first antenna |
| Active | 0 | 1 | Decrement gain |
| Active | 1 | 0 | Increment gain |
| Active | 1 | 1 | Reset to second predetermined gain level: e.g. initial gain for second antenna |
| No Clock | — | — | Hold gain |

It should be noted here that the accumulator logic unit 905 can conveniently implemented using dedicated and/or programmable logic circuitry arranged as a finite state machine following the state transitions shown in the above logic table discussed above with reference to FIG. 6. Alternatively, the accumulator logic unit 905 can be implemented in whole or in part using a programmed information processor such as a general purpose microprocessor, microcontroller, or specific purpose processor such as a digital signal processor programmed in accordance with this table. Further, it should also be noted that even though a decoder 110 is shown here to convert the $GAIN_N$ signal into corresponding updated reference data) VGA control information (COMP), in alternative embodiments and implementations such conversion need not be required and the updated reference data could be used directly.

Figure 6:
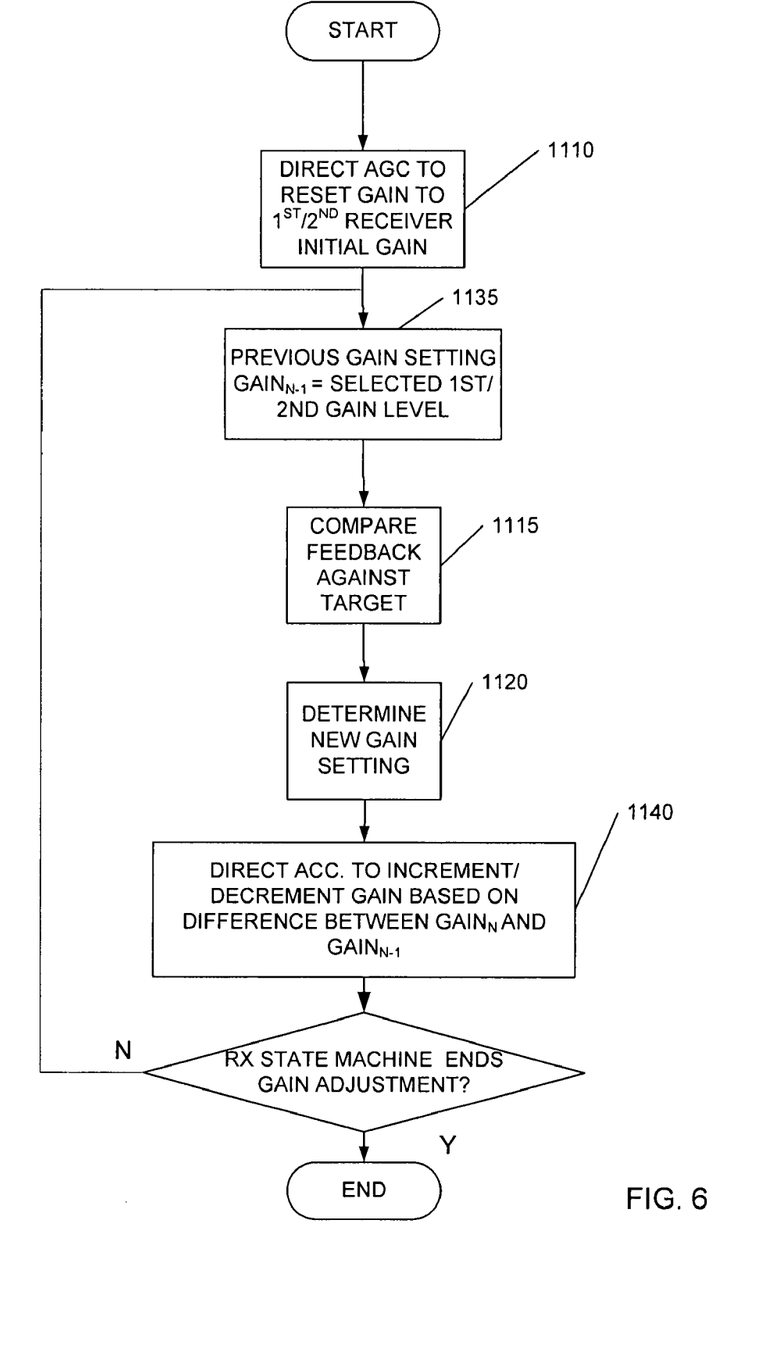
FIG. 6 is a flowchart detailing processing undertaken by a controller consistent with the disclosed embodiments of the invention.

Processing undertaken by the difference controller 310 (or controller 510) and AGC 151 on a per packet basis will now be detailed with reference to FIG. 6. Processing begins at step 1110, in which the controller directs the accumulator to reset the gain to the first or second initial receiver pathway gain level based on the current pathway information from the diversity receiver antenna select logic (not shown in the figures). Control then transitions to step 1135 in which the previous gain setting is equated to the first or second selected gain level. Control thereafter transitions to step 1115.

At step 1115, a comparison is made by the AGC 151 between the received feedback and an ideal gain signal in order to determine the instantaneous gain error 155. Then, in step 1120, the DLPF 125 of the AGC 151 recovers the adjusted gain setting $GAIN_N$ and transmits this to the controller 310 (or 510). Control thereafter passes to step 1140, in which the controller 310/510 directs the accumulator to increment or decrement its internal gain value based on the difference between the new and previous gain settings. Steps 1135, 1115, 1120, and 1140 thereafter reiterate in sequence until the receiver state machine reaches a pre-programmed state, the AGC stops and the gain is held at the final settled value. Controller AGC processing thereafter terminates. It should be noted that the gain is held at the final settled value until reset to the first or second predetermined values at the beginning of the next received packet (step 1110).

It should be noted here that in this embodiment, the above mentioned processing should execute once per CLK cycle of the digital signal undergoing feedback analysis, which is produced by the ADC 115. As such, this processing may be implemented by dedicated high speed logic in isolation or in combination with an information processor such as a microprocessor or microcontroller as is well known in the art programmed in accordance with the processing detailed above with reference to FIG. 6, as long as the processing can be achieved generally within these timing parameters.

Figure 4:
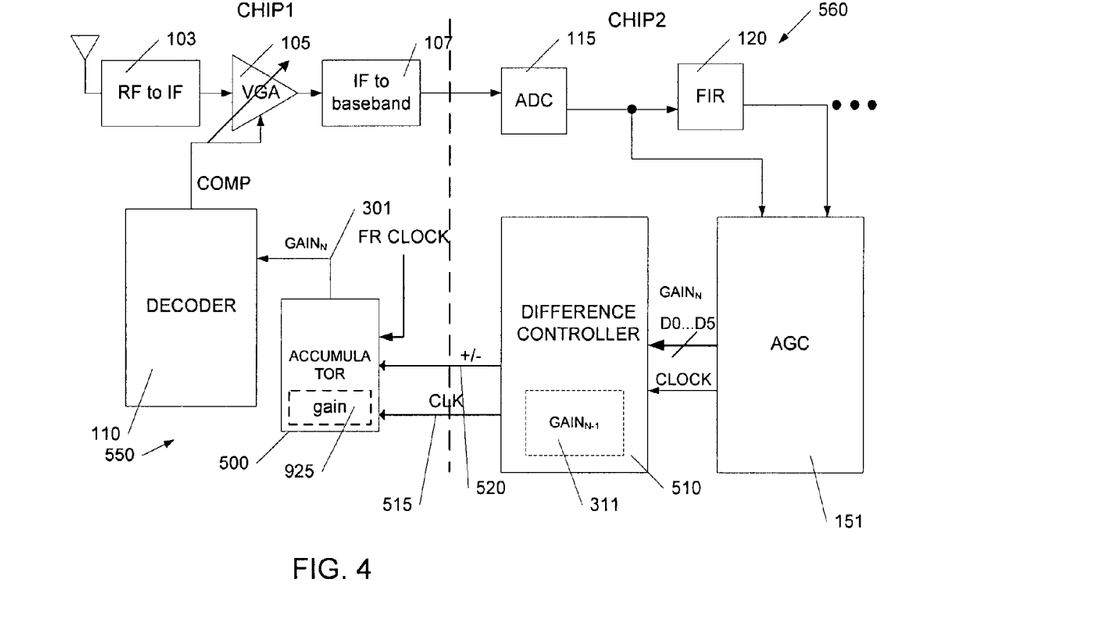
FIG. 4 is a simplified block diagram of an intercircuit communication apparatus according to a second embodiment of the invention generally interchangeable with the intercircuit communication apparatus shown in FIG. 3.

Turning now to FIG. 4, FIG. 4 is a simplified block diagram of an intercircuit communications apparatus according to a second embodiment of the invention. This intercircuit communications apparatus, including an accumulator 500 of a first circuit 550 communicatively coupled to a controller 510 of a second circuit 560, differs from the communications apparatus shown in FIG. 3 primarily in that a single signal line +/− 520 and the CLK 515 are used by the controller 510 to notify the accumulator of numeric data such as updated variable gain amplifier setting information. When CLK is high, the accumulator 510 increments the gain reference data if the +/− signal 520 is also high (true), and decrements the gain while the +/− signal 520 is low (false). In this embodiment, resetting the accumulator 500 to one of two predetermined gain levels such as the initial gain levels for the first and second receive pathways in a diversity receiver implementation may be achieved through e.g. detection of certain CLK transitions on the CLK signal line 515, or assessing the state of the +/− signal 520 while the CLK signal is not asserted. In either case, the CLK signal 515 may be treated as a signal line to help define at least four states (increment, decrement, hold, reset), and so a separate free-running clock signal (FR CLOCK) may be used to drive the synchronous components of the accumulator 550. This free-running clock may be conveniently operate at a higher frequency than the CLK frequency to enable the accumulator to easily distinguish transitions in the +/− 520 and CLK 515 signals.

The actual composition of the accumulator 500 according to the second embodiment of the invention is similar to that of the accumulator 300 shown in FIG. 5, with the obvious difference in the type of signals being handled and the state transitions undertaken. Similar to the preceding embodiments, the accumulator logic unit may include any combination of dedicated logic circuitry, programmable logic circuitry including ASICs, or information processors capable of responding to the signal transitions noted above.

It will be obvious to those having skill in the art that many changes may be made to the details of the above-described embodiments of this invention without departing from the underlying principles thereof. For example, the numeric data need not be limited to any particular type of numeric data such as adjusted or initial gain settings or levels as presented in the above described embodiments. It is in fact contemplated that intercircuit communications techniques consistent with the present invention are not so limited and are intended to encompass the notification of numeric data generally. Likewise, although the above-described embodiments focus in on a type of intercircuit communication involving chip to chip communication (i.e. interchip communication), the teachings of the present invention are not meant to be so limited and can conveniently be implemented any time a first electronic circuit, device or component needs to notify a second electronic circuit, device or component of numeric data, regardless of any interposing chip boundaries. The scope of the present invention should, therefore, be determined only by the following claims.

What is claimed is:

1. A system comprising:
   a circuit that stores a first value;
   M parallel signal lines that communicate with said circuit, where M is an integer greater than three; and
   a difference controller that receives said first value via said M parallel signal lines, that compares said first value to a first reference value, and that generates control signals based on a difference between said first value and said first reference value;
   N signal lines, where N is less than or equal to three; and
   an accumulator circuit that communicates with said N signal lines, that stores a second reference value and that performs one of increment and decrement function to adjust said second reference value based on said control signals.

2. The system of claim 1 wherein said difference controller sets said first reference value to said first value after generating said control signals.

3. The system of claim 1 wherein said difference controller generates said control signals to adjust said second reference value to said first value over T adjacent clock periods, where T is greater than one.

4. The system of claim 1 wherein said N signal lines comprise a first signal line and a second signal line and wherein said difference controller generates one of an increment signal and a decrement signal on said first and second signal lines.

5. The system of claim 4 wherein said difference controller generates one of a plurality of increment signals on said first signal line and a plurality of decrement signals on said second signal line over T adjacent clock cycles, where T is an integer greater than one, to adjust said second reference value to said first value.

6. The system of claim 4 wherein said N signal lines include a third signal line that communicates with said accumulator circuit, and wherein said accumulator circuit adjusts said second reference value based on a third signal on said third signal line and said one of said increment signal and said decrement signal.

7. The system of claim 6 wherein said first, second and third signals comprise one of a first state and a second state, wherein said accumulator circuit increments said second reference value when said first signal has said first state, said second signal has said second state and said third signal has said first state and wherein said accumulator circuit decrements said second reference value when said first signal has said second state, said second signal has said first state and said third signal has said first state.

8. The system of claim 7 wherein said accumulator circuit resets said second reference value to a reset value when said third signal has said first state while said first and second signal both have one of said first state or said second state.

9. The system of claim 1 wherein said circuit, said difference controller and said accumulator circuit are implemented on a single integrated circuit.

10. The system of claim 1 wherein said circuit and said difference controller are implemented by a first integrated circuit and said accumulator circuit is implemented by a second integrated circuit.

11. A Radio Frequency (RF) transceiver system comprising:
    a baseband processing circuit comprising:
       a gain circuit that outputs a first gain value using M parallel signal lines where M is an integer greater than three; and
       a difference controller that receives said first gain value via said M parallel signal lines, that compares said first gain value to a first reference gain value, and that generates control signals on N signal lines based on a difference between said first gain value and said first reference gain value, where N is less than or equal to three; and
    a RF baseband converter circuit that communicates with said N signal lines, that comprises an accumulator circuit that stores a second reference gain value and that performs one of increment and decrement function to adjust said second reference value based on said control signals.

12. The RF transceiver system of claim 11 wherein said RF baseband converter comprises:
    a variable gain amplifier comprising a second gain value, wherein said RF baseband converter; and
    a decoder that adjusts said second gain value based on said second reference gain value.

13. The RF transceiver system of claim 11 wherein said difference controller generates said control signals to adjust said second reference gain value to said first gain value over T adjacent clock periods, where T is greater than one.

14. The RF transceiver system of claim 11 wherein said N signal lines comprise an first signal line and a second signal line and wherein said difference controller selectively generates one of an increment signal and a decrement signal on said first signal line and said second signal line.

15. The RF transceiver system of claim 14 wherein said difference controller generates one of a plurality of increment signals on said first signal line and a plurality of decrement signals on said second signal line over T adjacent clock cycles, where T is an integer greater than one, to adjust said second reference gain value to said first gain value.

16. The RF transceiver system of claim 14 wherein said difference controller outputs a third signal on a third signal line that communicates with said accumulator circuit, and wherein said accumulator circuit adjusts said second reference gain value based on said third signal, said increment signal and said decrement signal.

17. The RF transceiver system of claim 16 wherein said first, second and third signals comprise one of a first state and a second state, wherein said accumulator circuit increments said second reference gain value when said first signal has said first state, said second signal has said second state and said third signal has said first state and wherein said accumulator circuit decrements said second reference gain value when said first signal has said second state, said second signal has said first state and said third signal has said first state.

18. The RF transceiver system of claim 17 wherein said accumulator circuit resets said second reference gain value to a reset gain value when said third signal has said first state while said first and second signal both have one of said first state or said second state.

19. The RF transceiver system of claim 11 wherein said baseband processing circuit and said RF baseband converter circuit are implemented on a single integrated circuit.

20. The RF transceiver system of claim 11 wherein said baseband processing circuit is implemented by a first integrated circuit and said RF baseband converter circuit is implemented by a second integrated circuit.

21. A method comprising:
outputting a first value using M parallel signal lines, where M is an integer greater than three;
receiving said first value via said M parallel signal lines;
comparing said first value to a first reference value;
generating control signals on N signal lines based on a difference between said first value and said first reference value, where N is less than or equal to three; and
storing a second reference value remotely from said first reference value and said first value;
performing one of increment and decrement function based on said control signals to adjust said second reference value.

22. The method of claim 21 further comprising setting said first reference value to said first value after generating said control signals.

23. The method of claim 21 further comprising generating said control signals to adjust said second reference value to said first value over T adjacent clock periods, where T is greater than one.

24. The method of claim 21 wherein said N signal lines comprise a first signal line and a second signal line and further comprising generating an increment signal on said first signal line and a decrement signal on said second signal line.

25. The method of claim 24 further comprising generating one of a plurality of increment signals on said first signal line and a plurality of decrement signals on said second signal line over T adjacent clock cycles, where T is an integer greater than one, to adjust said second reference value to said first value.

26. The method of claim 25 wherein said N signal lines further comprises a third signal line and further comprising:
outputting a third signal on said third signal line; and
adjusting said second reference value based on said third signal, said increment signal and said decrement signal.

27. The method of claim 26 wherein said first, second and third signals comprise one of a first state and a second state, and further comprising:
incrementing said second reference value when said first signal has said first state, said second signal has said second state and said third signal has said first state; and
decrementing said second reference value when said first signal has said second state, said second signal has said first state and said third signal has said first state.

28. The method of claim 27 further comprising resetting said second reference value to a reset value when said third signal has said first state while said first and second signal both have one of said first state or said second state.

* * * * *